(12) United States Patent
Zylstra et al.

(10) Patent No.: US 8,400,744 B2
(45) Date of Patent: Mar. 19, 2013

(54) EARTH LEAKAGE DETECTION MODULE WITH ROBUST TRANSIENT SUPPRESSION

(75) Inventors: Henry J. Zylstra, Alburnett, IA (US); Steven M. Meehleder, Cedar Rapids, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 375 days.

(21) Appl. No.: 12/783,185

(22) Filed: May 19, 2010

(65) Prior Publication Data
US 2011/0286134 A1 Nov. 24, 2011

(51) Int. Cl.
| H02H 3/08 | (2006.01) |
| H02H 9/02 | (2006.01) |
| H02H 1/00 | (2006.01) |
| H02H 1/04 | (2006.01) |
| H02H 3/22 | (2006.01) |
| H02H 9/06 | (2006.01) |

(52) U.S. Cl. .................. 361/93.1; 361/117; 361/118
(58) Field of Classification Search .................. 361/93.1
See application file for complete search history.

(56) References Cited

U.S. PATENT DOCUMENTS

| 4,542,432 A * | 9/1985 | Nichols et al. .................. 361/44 |
| 4,901,183 A * | 2/1990 | Lee .................. 361/56 |
| 6,452,767 B1 * | 9/2002 | Brooks .................. 361/42 |
| 6,583,997 B1 * | 6/2003 | Reid et al. .................. 363/50 |
| 8,040,648 B2 * | 10/2011 | Baudesson .................. 361/91.5 |
| 2010/0019778 A1 * | 1/2010 | Park et al. .................. 324/652 |

OTHER PUBLICATIONS

PowerPact® H- and J-Frame Circuit Breakers; Catalog 2010; Dated Jun. 2010; (3 pages).

* cited by examiner

*Primary Examiner* — Dharti Patel
(74) *Attorney, Agent, or Firm* — Nixon Peabody LLP

(57) ABSTRACT

A module for a high voltage electronic circuit breaker that includes a power supply and related circuitry for suppressing high voltage transients. The power supply receives a range of voltages, such as up to 600V, and is powered from the line current instead of through a transformer, exposing the module electronics to potential voltage transients. A large capacitor is connected to the high voltage input for absorbing the energy of a voltage transient. Transient voltage suppressors are connected in parallel to the capacitor to absorb any further energy in the transient not absorbed by the capacitor. Inductors are series-connected with the high voltage input to present an impedance and inductance to the voltage transient, reducing the transient before it reaches the power supply. Inductors in the trip coil and the indicator coils also present an impedance and inductance to the transient, further enhancing protection against transients. Fuses connected in line with the high voltage input protect the module electronics against short circuits.

18 Claims, 6 Drawing Sheets

EARTH LEAKAGE DETECTION MODULE WITH ROBUST TRANSIENT SUPPRESSION

FIELD OF THE INVENTION

The present disclosure relates generally to electronic circuit breakers, and, more particularly, to an electronic fault-detection module connectable to a companion electronic circuit breaker.

BACKGROUND

Electronic circuit breakers make and break electrical connections to a load protected by the circuit breaker by causing a shunt trip, typically by energizing a solenoid that acts upon a trip mechanism for mechanically separating electrical contacts carrying electrical current from the line through the circuit breaker to the load. The solenoid requires a reliable source of power to ensure reliable tripping in response to the detection of certain electrical faults, such as ground faults. A power supply in the circuit breaker can be powered from the voltage on the line conductor(s) entering the circuit breaker. When the power supply is directly line-powered, it is susceptible to transients. As the voltage input to the power supply increases, the risk of damage caused by transients increases. For electronic circuit breakers that are rated for the high end of a low voltage (LV) range, such as between 120-600V, the energy in transients at a 600V input will be much higher. Because the sensitive electronics including signal processing circuits responsible for detecting a fault condition are powered by the power supply, they are exposed along the signal chain to any voltage transient appearing on the voltage input. Accordingly, a need exists for a transient suppression circuit for an electronic circuit breaker that can reliably absorb the energy in a high voltage transient. A need also exists for a noise suppression circuit that reduces noise caused by interference so that the fault-sensing electronics can operate reliably and consistently across the range of voltage input to the circuit breaker.

A need also exists for a power supply that can reliably energize the trip solenoid without using a high voltage component to cause the tripping event across a wide range of low voltage inputs to the power supply, such as between 120-600V, in electrical distribution systems. Aspects of the present disclosure are directed to fulfilling these and other needs.

BRIEF SUMMARY

Aspects of the present disclosure are directed to a companion earth-leakage detection module with robust transient suppression to a circuit breaker that provides adjustable, low-level (e.g., 20 mA or 30 mA) ground fault protection that is used in conjunction with a circuit breaker. Advantageously, the module can provide enhanced ground fault protection relative to that provided by the companion circuit breaker, which may be in the range of amps, not milliamps. The module operates over the same range of voltage as the companion circuit breaker, such as between 120-600 Vac (alternating current voltage). In electrical distribution systems, this nominal operating voltage range is referred to a low voltage (LV) range, with 600 Vac representing the high end of the low voltage range. The module includes a low voltage power supply with enhanced protection against impulse voltages or transients and short-circuit failures of components within the module. The companion circuit breaker can have a rating between 150-225 A, for example.

The wide low voltage range of the module, e.g., between 120-600V, requires a robust protection scheme against transient voltages from the line conductors, which can damage the sensitive electronics in the module or the circuit breaker itself. While a transformer can provide galvanic isolation against transients, the power supply of the present disclosure derives its voltage directly from the line conductors, exposing the downstream electronics to any abnormalities on the line conductors. To protect against these transient voltages, a large capacitor is connected to the voltage input of a power supply. The capacitor has a large value, such as 1 µF (micro-Farad) or 1.5 µF, and a high voltage rating, such as 1100V, and absorbs the energy from a transient voltage without power dissipation. Any excess transient voltage that cannot be absorbed by the large capacitor is absorbed by one or more transient voltage suppressors (TVS). The large capacitor can be sized to absorb a transient as specified in Underwriters Laboratory (UL) 943 (Ground-Fault Circuit-Interrupters), having a peak voltage of 6,000V, a bi-wave shape (e.g., triangular wave), and lasting 50 microseconds at 3,000V.

In addition to the large capacitor for absorbing the energy of a transient voltage appearing on the line conductors to which the circuit breaker is connected, transient suppression is also carried out by the high voltage inductors connected in series with the line conductors, providing a series impedance that reduce the peak current that the large capacitor and the one or more transient voltage suppressors must absorb. The shunt trip coil, for tripping the circuit breaker, in conjunction with a trip indicator coil used for indicating that a ground fault trip has occurred also operate together to alleviate the energy that the large capacitor and the TVS devices must absorb.

The high (nominal operating) voltage input range of the power supply, e.g, up to 600V or higher, requires that the input voltage be rectified and reduced to a level sufficient to power the electronics in the module, e.g., to around 12 Vdc (direct current). Existing 12V regulators can accept around a 30V input and provide a regulated 12V output. To range (or shift) the input voltage to an acceptable level for a 12V regulator, the present disclosure proposes a "pre-regulator" circuit that combines a high voltage power MOSFET (metal-oxide-semiconductor field-effect transistor) and a clamping zener diode, which reduces the input voltage from a maximum of 600 Vac down to around 30 Vdc, which is then supplied to a 12V regulator for providing a regulated 12V supply to the electronics.

The power supply in the module is a linear power supply, which is easier to implement and less susceptible to noise. Switching power supplies by contrast can generate high frequency noise, and in an electronic circuit breaker environment, it is important to have high accuracy measurements for detecting fault conditions. The present disclosure thus proposes a way of line-powering a shunt trip without using a switching power supply. A "shunt trip" refers to an electronic trip where a signal is sent to a solenoid, which operates a mechanical trip mechanism that causes a movable contact to separate from another contact in the circuit breaker, thereby disconnecting a load being protected by the circuit breaker from the line supply. "Line-powered" means that the energy for energizing the shunt trip is supplied from the line conductors carrying the current to the circuit breaker. In the present disclosure, a low voltage circuit acts as a current sink, which in turns causes more and more current to be drawn through the trip solenoid located in a high voltage circuit. During nominal conditions when no fault condition is present, a small amount of current will flow through the trip solenoid, but not a sufficient amount to energize it and cause the breaker to trip. When a fault condition is detected, the low voltage circuit begins to draw more current, which in turn pulls more current through the high voltage circuit of the power supply until a sufficient amount of current is drawn through the trip solenoid to energize it.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

Figure 1:
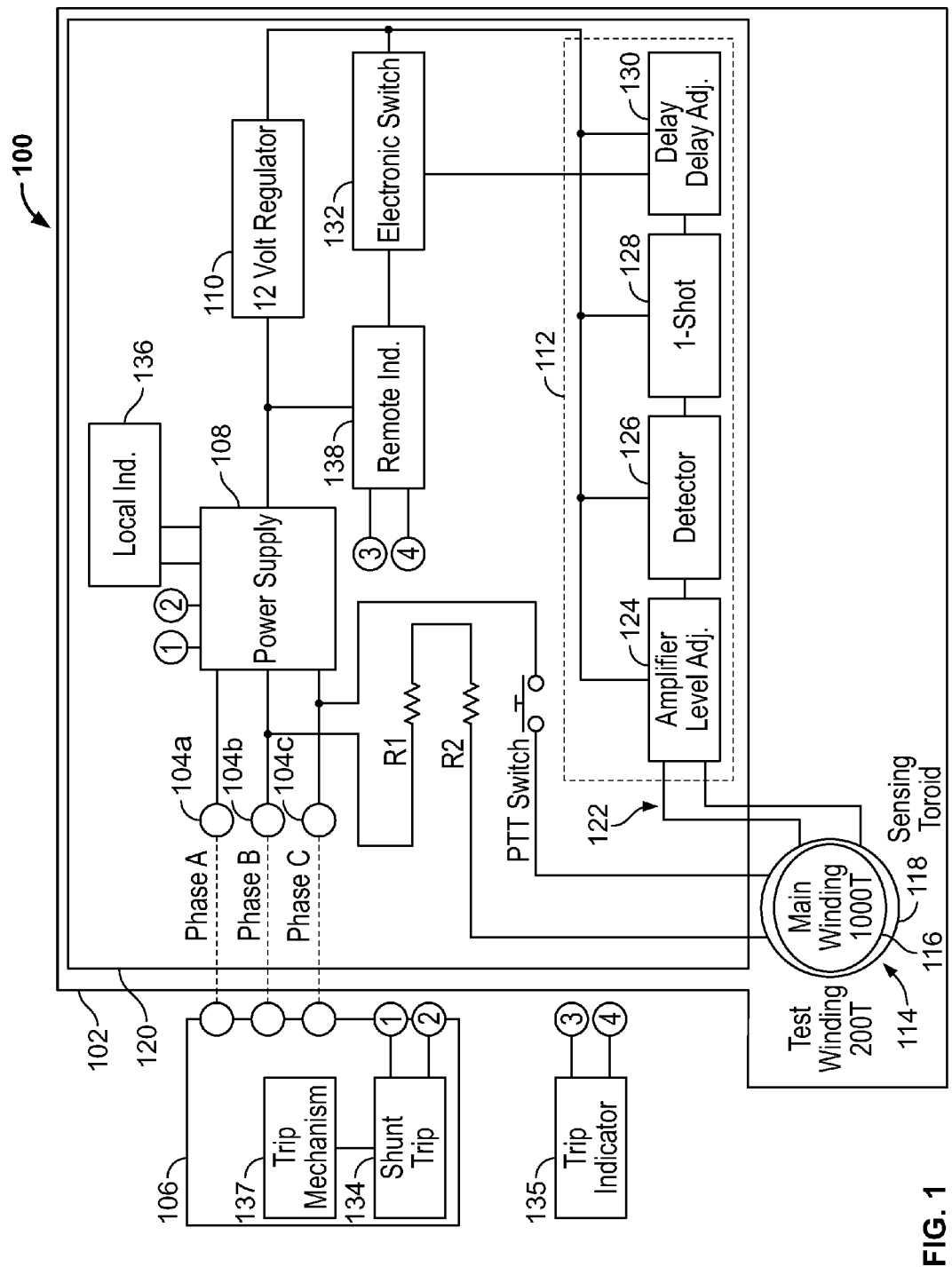
FIG. 1 is a functional block diagram of a companion earth-leakage detection module with robust transient suppression having an enclosure or a housing that protects and houses various components and electronics therein.

FIG. 1 is a functional block diagram of a companion earth-leakage detection module 100 having an enclosure 102 or a housing that protects and houses various components and electronics therein. The module 100 is powered by connections to the line conductors 104a,b,c, which carry respective phases A, B, and C of electrical current through a companion circuit breaker 106 to which the module 100 is connected. The module 100 includes a power supply 108 and a voltage regulator 110, which provides a regulated direct current (DC) voltage, such as 12V, to a sensing and delay circuit 112 and other electronic components on a circuit board 120 of the module 100. The module 100 includes a current sensor 114, such as a sensing toroid, having a main winding 116 and a test winding 118 wound around the main winding 116. The main winding 116 has a first number of turns, such as one thousand, and the test winding 118 has a second number of turns, such as two hundred. The current sensor 114 is connected by a wiring harness to the circuit board 120 of the module 100 (though the current sensor 114 can also be disposed on the circuit board 120 in other implementations). The three line conductors 104a-c conventionally pass through the open window of the current sensor 114, which has a toroid-shaped core. When no ground fault exists, the output of the current sensor 114 should be theoretically zero amps, though in reality it can be a few milliamps.

According to an aspect, the module 100 is configured to detect electrical faults such as ground faults, and in this configuration, if a ground fault signal exists relative to any of the line conductors 104a-c, the secondary winding of the current sensor 114 produces a signal 122 indicative of the magnitude of the ground fault, such as 30 mA. Preferably, the module 100 is configured to detect lesser ground faults than the companion circuit breaker 106 is capable of detecting to enhance the overall fault detection capability of the circuit breaker 106. This current signal 122 is processed by various functional blocks 124, 126, 128, 130, 132 that will be described next. These functional blocks can be realized as electronic circuitry in the form of discrete components, integrated circuits, firmware, machine-executable software stored on a non-transitory, tangible medium, or combinations thereof. The terms module, block, stage, and circuit as used herein are interchangeable. The functional blocks process the signal 122 from the current sensor 114 to determine whether the level of the signal 122 exceeds a predetermined minimum threshold value, and, if so, after a selectable delay, is passed to an electronic switch 132, which, in turn, causes a shunt trip module 134 to shunt trip the circuit breaker 106.

A local indicator 136 on the housing 102 of the module 100 and a remote indicator 138 coupled to a trip indicator 135 indicate that the status of the circuit breaker 106 is in a tripped position. The functional blocks include: an amplifier/trip-level adjustment module or circuit 124, a detector circuit 126, a one-shot circuit 128, a delay-time delay adjustment circuit 130, and an electronic switch circuit 132. The circuit breaker 106 conventionally includes a trip mechanism 137 coupled to the shunt trip module 134. The shunt trip module 134 includes an electronic solenoid that when energized causes the trip mechanism 137 to separate a movable contact from another contact in the circuit breaker, thereby physically and electrically disconnecting and isolating the load being protected by the circuit breaker from the line conductors 104a-c. The three line conductors 104a-c, each representing a different phase of electrical current, are connected from the circuit breaker to the module 102 by conventional connectors or lugs. In a three-phase electrical distribution system, each phase is 120 degrees offset from one another. These phases are conventionally referred to as Phase A, Phase B, and Phase C, respectively. The present disclosure is not limited to a three-phase system, but rather can be used in a single-phase or any polyphase electrical distribution system. The power supply 108 of the present disclosure is particularly suited for low voltage electrical distribution systems, such as in a semiconductor fabrication facility or an automotive manufacturing plant, which can require voltages as high as 600V or 660V (a maximum nominal operating voltage) and as low as 80V or 120V (a minimum nominal operating voltage). The ratio of the maximum to minimum nominal operating voltage exceeds 4:1, and can be as high as 5:1 or even 8:1. The line conductors 104a-c correspond to a voltage input when a voltage is applied at the conductors. The term "low voltage" in the context of the voltage inputted into the module has its meaning as understood in the context of electrical distribution systems, typically about 120-600V under nominal operation. The term "medium voltage" in the context of the voltage inputted into the module refers to voltages from 600V up to 15 kV under nominal operation, and the term "high voltage" in the context of the voltage inputted into the module refers to voltages above 15 kV under nominal operation. In the low voltage or LV range, 600V is at the high end of the nominal operating LV range, and corresponds to a maximum nominal operating voltage in this example.

Figure 2:
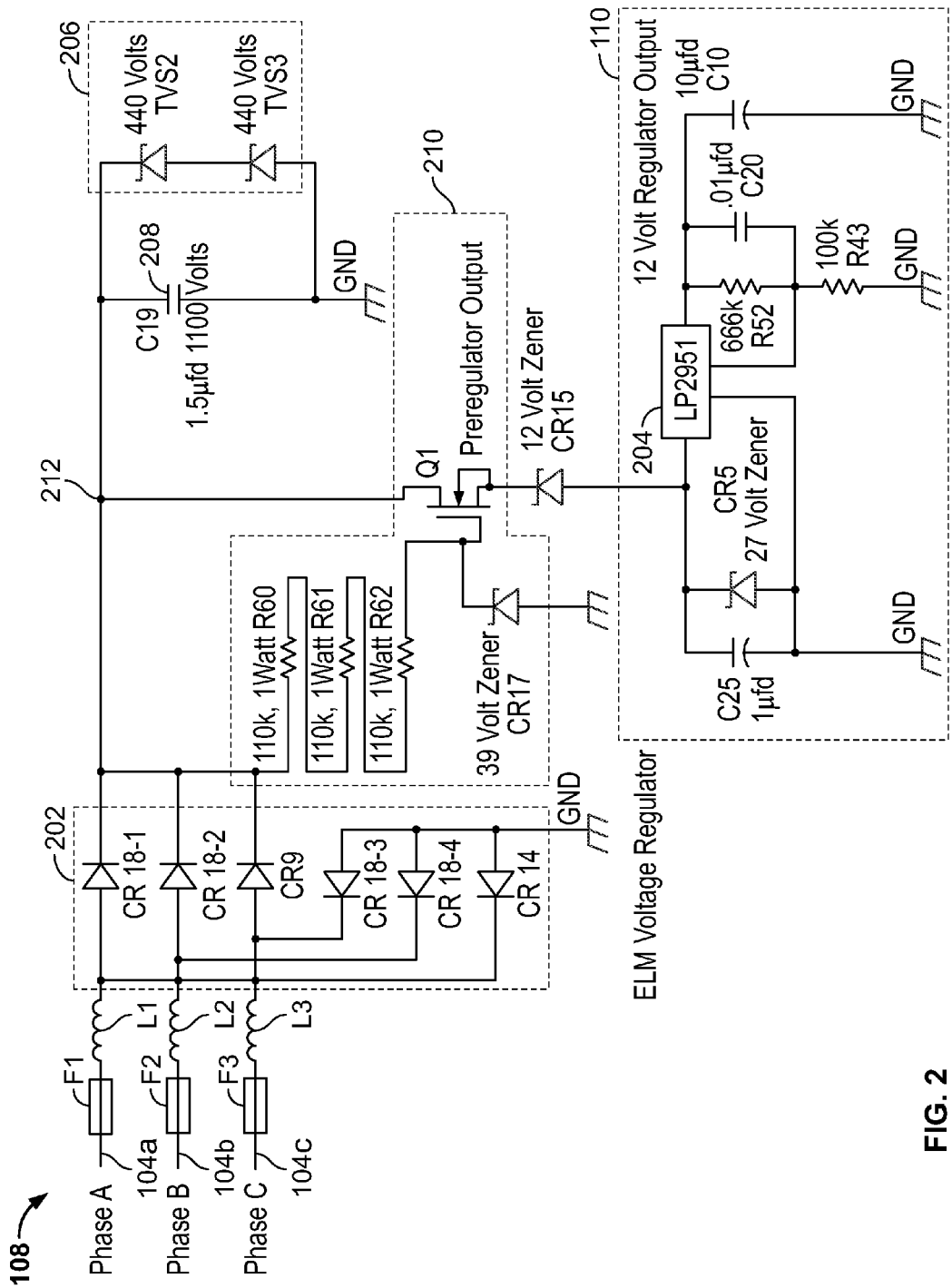
FIG. 2 illustrates an exemplary schematic representation of the power supply shown in FIG. 1.

FIG. 2 illustrates an exemplary schematic representation of the power supply 108. The power supply 108 is configured to (1) provide a regulated 12 volt supply over the nominal operating range of the low voltage input at the line conductors 104a-c (e.g., 120-600V); (2) protect against high impulse voltages or transients appearing on the line conductors 104a-c; (3) filter noise appearing on the line conductors 104a-c; and (4) limit the energy caused by a short circuit on the circuit board 120. The power supply 108 can accept a range of nominal operating input voltages between 120 Vac (alternating current voltage) to 600 Vac, though this range can be as low as 80 Vac and as high as 660 Vac. Nominal operating voltage refers to a normal operating voltage that the circuit breaker is designed and rated to accept without tripping. The range of voltages at which the circuit breaker is designed to operate can also be referred to as the rated voltage. The rated voltage or nominal operating voltage are distinct from the voltages present during transient voltages, which can be on the order of thousands of volts.

The power supply 108 can operate when voltages are present on only two of the three line conductors 104a-c by virtue of the six high voltage diodes CR18-1, CR18-2, CR9, CR18-3, CR18-4, and CR14 forming a rectifier circuit 202 connected to the line conductors 104a-c as shown in FIG. 2 through series-connected inductors L1-L3, respectively. The output of the rectifier circuit 202 is a high voltage supply 212, commensurate with the voltage input present on the line conductors 104a-c. A pre-regulation function of the power supply 108 is provided by the high voltage power MOSFET Q1, the gate resistors R60, R61, and R62, and the gate zener diode CR17, which comprise a pre-regulator circuit 210. The pre-regulator circuit 210 steps down the input voltage so that it is within a range that can be accepted by a 12V voltage regulator 110. The source terminal of the transistor Q1 outputs a pre-regulated voltage of approximately 38-39V over the rated input voltage range (e.g., 120-600V) of the power supply 108. This pre-regulated voltage is applied to the 12V voltage regulator 204, which includes an adjustable micropower voltage regulator, such as a voltage regulator LP2951 available from National Semiconductor, through a 12V dropping zener diode CR15 connected to the source terminal of the transistor Q1 as shown. The output of the voltage regulator 204 is a steady direct current (DC) 12V output independent of the operating voltage present on the line conductors 104a-c. The capacitors C25 and C10 provide additional storage to extend the range of the voltage regulator 110. The drain terminal of the transistor Q1 is connected, optionally through a diode CD1 (shown in FIG. 7), to the high voltage supply 212, and the gate terminal of the transistor Q1 is connected to the zener diode CR17, which is also connected to ground. The series-connected gate resistors R60, R61, and R62 are also connected to the gate terminal of the transistor Q1 and also to the high voltage supply 212.

The power supply 108 is also operable to protect against high voltage transients appearing on any one or more of the line conductors 104a-c without using transformers. To do so, a number of protection circuits are disclosed, any combination of which can be implemented in a multitude of configurations. First, a large capacitor can be connected to the high voltage supply 212 for absorbing high voltage transients, such as transient voltages up to 6000V. Second, "backup" transient voltage suppressors can be connected to the high voltage supply 212 for absorbing additional energy in the transient that cannot be absorbed by the large capacitor. Third, inductors in series with the line conductors and the high voltage supply 212 present an impedance to a high voltage transient that operates to suppress it and also to suppress high frequency noise in the transient. The inductors in the shunt trip 134 and the indicators 136, 138 also work in conjunction with the other components to provide robust protection against transients. In an implementation having all of these protection circuits, a robust transient suppression system is realized for protecting the sensitive electronics of the module 100. These considerations are more paramount in a system lacking transformers to provide galvanic isolation between the line conductors and the electronics responsible for sensing electrical faults and shunt tripping the circuit breaker.

A large storage element 208, such as a capacitor C19, is connected in parallel with a voltage clamp 206, which in the FIG. 2 example is a pair of series-connected transient voltage suppressors, TVS2 and TVS3. The storage element 208 can be a large capacitor C19, such as 1.0-1.5 μF, reliably operating at voltages of at least 1100V without any significant power dissipation. Any excess transient voltage not absorbed by the large storage element, e.g., capacitor C19, is absorbed by the voltage clamp 206. Three high voltage inductors L1, L2, and L3 provide a series impedance that reduces the peak current that the storage element 208 and the voltage clamp 206 need to absorb. The high voltage inductors L1-L3 are connected in series with the respective line conductors 104a-c, and are each connected to the input of the rectifier circuit 202. As shown in FIG. 2, the voltage clamp 206 and the storage element 208 are connected to the high voltage supply 212 in parallel between the output of the rectifier circuit 202 and ground. The large storage element 208 and the voltage clamp 206 are coupled directly to the line conductors 104a-c without any intervening galvanically isolating device, such as a transformer. As such, the components and other sensitive electrical circuits of the circuit board 120 are exposed to any transients that may appear on the line conductors 104a-c. The large storage element 208, such as the large capacitor C19, absorbs most of the energy in a transient appearing on the line conductors 104a-c, and optionally, any excess energy can be further absorbed by the TVS devices, TVS2 and TVS3, which draw lots of current when their clamping voltage is exceeded. The capacitor C19 also suppresses noise present on the high voltage supply 212. Without the presence of the large capacitor C19, a high voltage present on the high voltage supply 212 would damage the transistor Q1 and potentially other electronic components downstream of the transistor Q1.

The size of the large capacitor C19 should be selected to absorb as much of the transient's energy as possible. Although a capacitance of 1 μF or larger is recommended herein, the size of the capacitor C19 is a function of any one or more of the wave shape of the transient signal, the peak voltage of the transient, the duration of the transient, such as at half the peak voltage, and the series impedance of the conductor(s) that carry the transient. The transient wave shape can be a ring wave or a bi-wave (such as a triangular wave), which has more energy than a ring wave. The series impedance is a function of how far the source of the transient is from the circuit breaker 106. The series impedance is generally modeled by a transient generator, and can range from, e.g., 2 ohms to 500 ohms or larger. A lower series resistance will require a higher capacitance. Finally, the peak voltage represents the peak voltage of the transient. Example systems having a maximum input voltage of 600V can be designed to a peak voltage of 6000V or higher (6000V peak voltage is specified by the UL 943). A higher peak voltage will require a larger capacitor and clamping diodes. UL 943 also specifies a triangular wave shape enduring 50 microseconds at 3000V with a peak voltage of 6000V. The large capacitor C19 can be sized, independently or together with the TVS2 and TVS3 diodes, to absorb all or substantially all of the energy from a transient meeting these characteristics.

The power supply 108 also limits high frequency noise through a low pass filter created by the storage element 208 in combination with the inductors L1, L2, and L3. The shunt trip coil 134 and the trip indicator coil 136 also operate to limit high frequency noise.

The power supply 108 can also protect the components on the circuit board 120 against a short circuit on the circuit board 120. A first fuse F1 is positioned at the voltage input of the line conductor 104a to the module 100. A second fuse F2 is positioned at the voltage input of the line conductor 104b to the module 100. A third fuse F3 is positioned at the voltage input of the line conductor 104c to the module 100. Under non-short-circuit conditions, including when voltage transients are present on the line conductors 104a-c, the fuses will remain closed; however, if a short circuit on the circuit board 120 occurs, the fuses F1, F2, F3 open within a few milliseconds following the short circuit to prevent fire damage, expelled debris, and exposed live voltages caused by a crack or damage to the enclosure 102. This additional protection can be desirable because of the relatively high voltage and high energy supplied at the 480 VAC or 600 VAC operating voltages.

Exemplary values or ratings of the components shown in FIG. 2 are set forth in the following table:

| Component | Exemplary Value or rating |
| --- | --- |
| R60, R61, R62 | 110 kΩ, 1 Watt |
| C19 | 1.5 µF, 1100 V |
| TVS2, TVS3 | 440 V |
| CR15 | 12 V (breakdown) |
| CR17 | 39 V (breakdown) |
| C25 | 1 µF |
| CR5 | 27 V (breakdown) |
| R52 | 666 kΩ |
| C20 | 0.01 µF |
| C10 | 10 µF |
| R43 | 100 kΩ |

Figure 3:
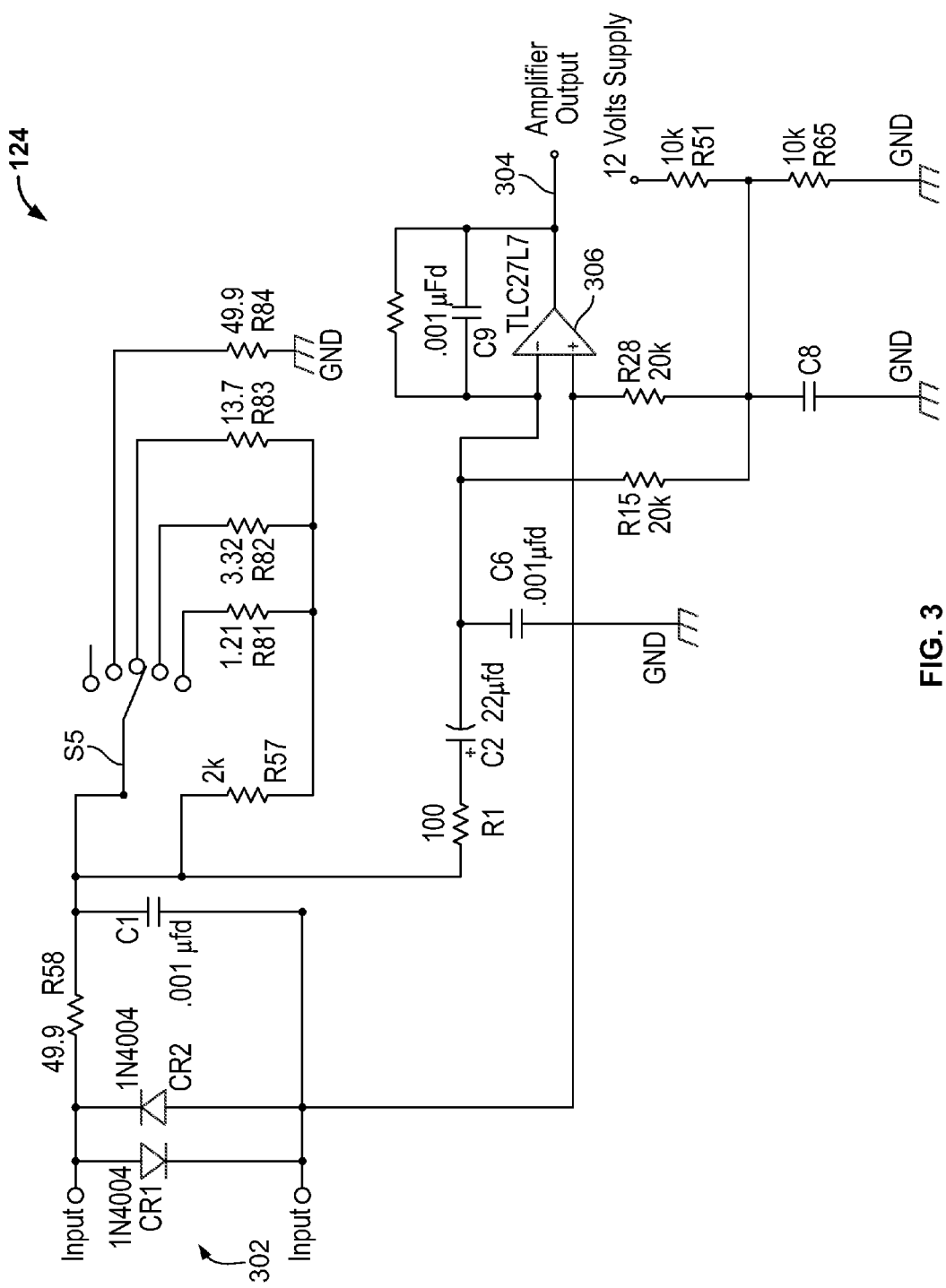
FIG. 3 is a schematic representation of the amplifier/trip-level adjustment circuit shown in FIG. 1.

FIG. 3 is a schematic representation of the amplifier/trip-level adjustment circuit 124 shown in FIG. 1. This circuit 124 ranges the current outputted from the current sensor 114 and also allows for user adjustment of the ground-fault trip point thresholds to one of five predefined levels (in this example, 30 mA, 100 mA, 300 mA, 1 A, and 3 A). A ground-fault trip point threshold is a minimum level of fault current above which the circuit breaker will trip. The input 302 of the amplifier receives the signal 122 from the secondary winding of the current sensor 114, which produces an indication of the current flowing through the line conductors 104a-c. The diodes CR1 and CR2, connected across the input 302, clamp the input voltage at approximately 0.6V to limit the input voltage. A rotary selector switch S5 adjusts the ground-fault trip point threshold by adjusting the effective (resistive) burden on the current sensor 114. At the most sensitive position (the open contact position), e.g., 20 mA or 30 mA, the burden on the current sensor 114 is provided only by the resistor R57. Should the contacts of S5 open on any of the five positions, the pick-up level defaults to the minimum setting (30 mA in this example). At higher ground-fault trip point thresholds the selector switch S5 adds a resistor on parallel with the resistor R57, namely resistors R84, R82, R83, and R81, respectively. These trip point thresholds can correspond to higher threshold values, such as 100 mA, 300 mA, 1 A, and 3 A, respectively. These user-adjustable trip point thresholds correspond to the minimum ground-fault current that is sensed by the current sensor 114 to cause the circuit breaker to trip.

The output 304 of the amplifier stage at the quiescent state is one half of the supply voltage maintained by the 12V regulator 110, i.e., 6V in this example. The output 304 is biased by the resistors R51, R65, R28, and R15 and is applied to the detector circuit 126. The capacitors C1, C8, and C6 in FIG. 3 are for noise suppression, and the capacitor C9 provides frequency roll-off for the amplifier 306. An example of a suitable amplifier 306 is the dual-precision single supply micropower operational amplifier model TLC27L7 available from Texas Instruments.

Exemplary values or ratings of the components shown in FIG. 3 are set forth in the following table:

| Component | Exemplary Value or rating |
| --- | --- |
| R58 | 49.9 Ω |
| C1, C6, C9 | 0.001 µF |
| R57 | 2 kΩ |
| R81 | 1.21 Ω |
| R82 | 3.32 Ω |
| R83 | 13.7 Ω |
| R84 | 49.9 Ω |
| R1 | 100 Ω |
| C2 | 22 µF |
| R15, R28 | 20 kΩ |
| R51, R65 | 10 kΩ |

Figure 4:
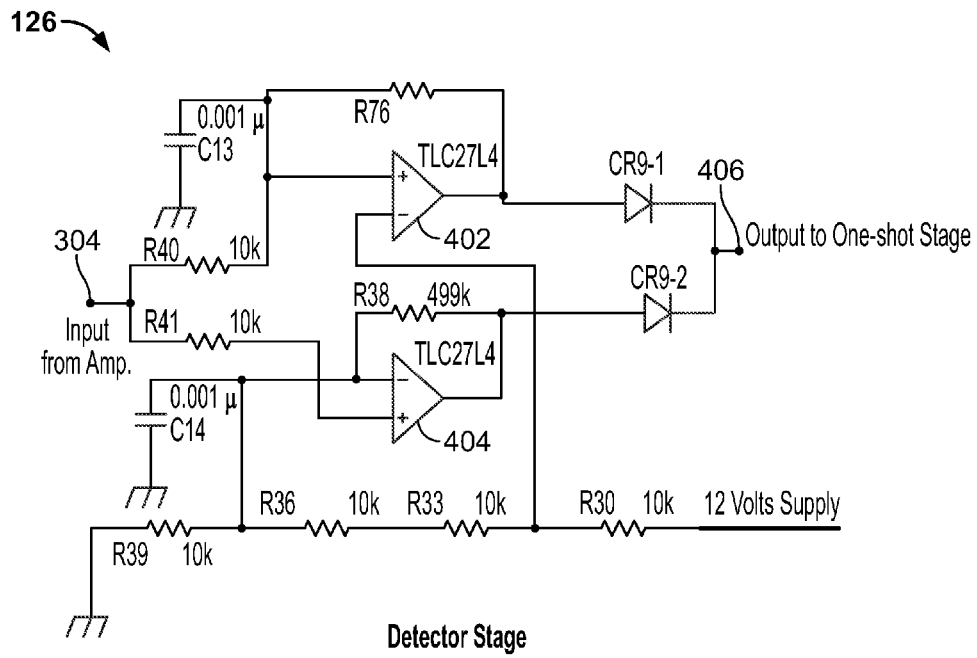
FIG. 4 illustrates an exemplary schematic representation of the detector circuit shown in FIG. 1.

FIG. 4 illustrates an exemplary schematic representation of the detector circuit 126 shown in FIG. 1. A purpose of the detector circuit 126 is to detect when the output 304 from the amplifier circuit 124 exceeds the 6V quiescent level by 3V in the positive or negative direction, i.e., greater than 9V or less than 3V in this example that assumes a 12V regulated supply. The operational amplifier (op-amp) 402 detects positive excursions of the voltage above the 6V quiescent level, while the op-amp 404 detects negative excursions of the voltage below the 6V quiescent level. Both the positive and negative portions of the voltage waveform can be detected. An example of a suitable op-amp 402, 404 is the quad precision single supply micropower operational amplifier model TLC27L4 available from Texas Instruments.

The op-amp 402, the resistors R40 and R76, the capacitor C13, and a rectifier diode CR9-1 detect the positive-going portions of the voltage waveform. In response to the positive-going wave of the voltage exceeding 9V at the non-inverting input of the op-amp 402, the op-amp 402 produces a pulse at the output 406, the length of which is determined by the signal level and the feedback resistor R76 that gives the following detector circuit 126 some hysteresis. This positive pulse is applied to the one-shot circuit 128 through the rectifier CR9-1.

The op-amp 404, the resistors R41 and R38, the capacitor C14, and the rectifier diode CR9-2 detect the negative-going portions of the voltage waveform. In response to the voltage input to the detector circuit 126 falling below the 3V reference, the op-amp 404 produces a positive pulse at the output 406, the length of which is determined by the signal level and the feedback resistor R38. This positive pulse is applied to the one-shot circuit 128 through the rectifier CR9-2.

Exemplary values or ratings of the components shown in FIG. 4 are set forth in the following table:

| Component | Exemplary Value or rating |
| --- | --- |
| R30, R33, R36, R39, R40, R41 | 10 kΩ |
| C13, C14 | 0.001 μF |
| R38 | 499 kΩ |

Figure 5:
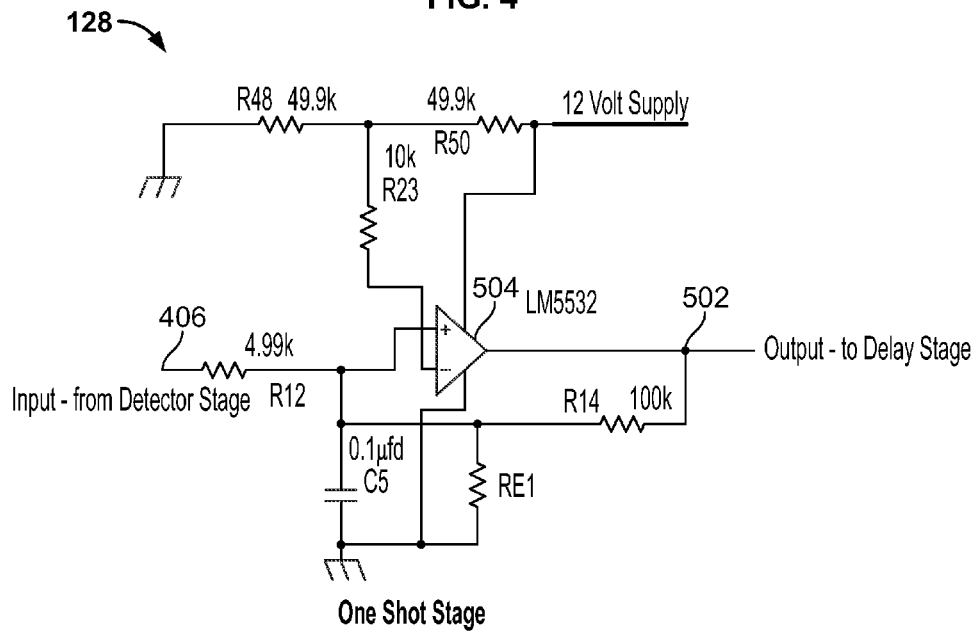
FIG. 5 illustrates a schematic representation of the one-shot circuit shown in FIG. 1.

FIG. 5 illustrates a schematic representation of the one-shot circuit 128 shown in FIG. 1. The one-shot circuit 128 extends or stretches the pulses outputted from the detector circuit 126 at the output 406 from about 1 ms to 8-10 ms. The output 502 of the one-shot circuit 128 is applied to the delay-time delay adjustment circuit 130. Once the voltage applied to the detector circuit 126 exceeds the threshold of detection, the one-shot circuit 128 is reset at least every half cycle of the AC waveform or every 8.3 ms (assuming a 60 Hz AC signal on the line conductors 104a-c), and a constant DC voltage output is applied to the delay-time delay adjustment circuit 130. In 50 Hz electrical systems, the one-shot circuit 128 is reset every 10 ms.

When the detector circuit 126 outputs a positive pulse on the output 406, the capacitor C5 quickly charges through the resistor R12, causing the output 502 of the one-shot circuit 130 to go high. With no additional input, the capacitor C5 will discharge to about 5.27V. When the voltage on the capacitor C5 drops below about 6V (the reference on the non-inverting input of the op-amp 504), the output 502 goes low. When the current from the current sensor 114 is above the selected trip point threshold, the one-shot circuit 130 is continuously set and the output 502 remains at a high level. The one-shot circuit 130 provides a charging voltage for the delay when the trip threshold peak (positive or negative) is exceeded. This charging voltage produces a time delay that is independent of level. If the time delay were charged by the output of the detector circuit 126, the pulse width would be a function of the signal level output by the detector circuit 126 and the resulting delay would also be a function of that signal level.

Exemplary values or ratings of the components shown in FIG. 5 are set forth in the following table:

| Component | Exemplary Value or rating |
| --- | --- |
| R48, R50 | 49.9 kΩ |
| C5 | 0.01 μF |
| R23 | 10 kΩ |
| R12 | 4.99 kΩ |
| R14 | 100 kΩ |

Figure 6:
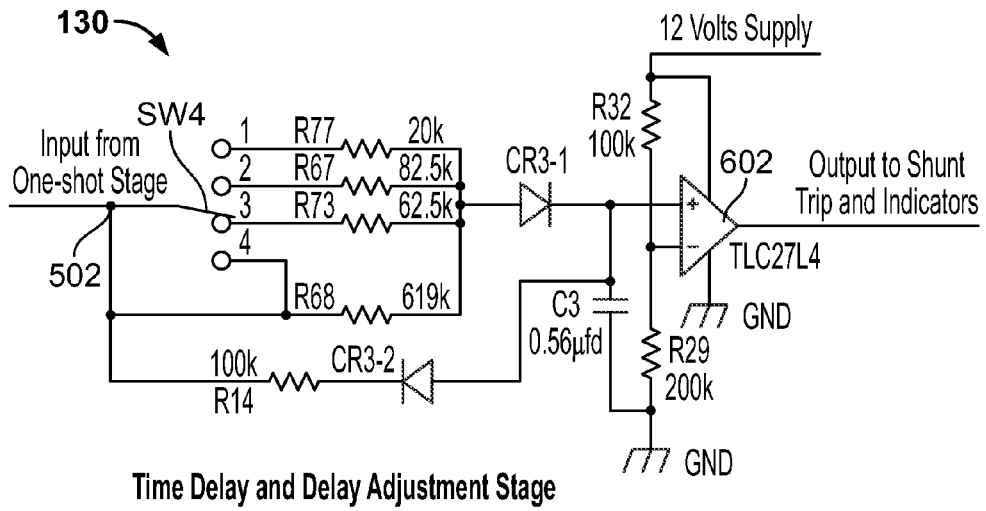
FIG. 6 illustrates a schematic representation of the delay-time delay adjustment circuit shown in FIG. 1.

FIG. 6 illustrates a schematic representation of the delay-time delay adjustment circuit 130 shown in FIG. 1. The output 502 from the detector circuit 126 is continuously about 12V (corresponding to the regulated supply voltage) when the current sensed by the current sensor 114 exceeds the trip point threshold. A delay is generated by charging the capacitor C3 through the resistors R77, R67, R73, and R68. The longest delay occurs when a switch SW4 selects position 4, where the capacitor C3 is charged through the resistor R68 only. When the switch SW4 selects position 3, the capacitor C3 is charged through the parallel combination of the resistors R68 and R73. In positions 2 and 1, respectively, the capacitor C3 is charged through the parallel combination of the resistor R68 and resistors R67 and R77, respectively. The default delay if any of the contacts on the switch SW4 are open is the maximum delay determined by the resistor R68. The resistor R14 and the diode CR3-2 provide a controlled discharge path for the capacitor C3. The discharge path controls how long the circuit will remember previous faults and determine the performance for intermittent faults.

The op-amp 602 is configured as a comparator. The comparator reference is set by the resistors R32 and R29, which is ⅔ of the 12V supply, or about 9V. When the capacitor C3 charges to the voltage on the inverting input to the comparator (in this example, 9V), the output of the comparator 602 transitions from a low value to a high value of nearly 12V, causing the shunt trip coil and the trip indicators to be energized.

Exemplary values or ratings of the components shown in FIG. 6 are set forth in the following table:

| Component | Exemplary Value or rating |
| --- | --- |
| R77 | 20 kΩ |
| C3 | 0.56 μF |
| R67 | 82.5 kΩ |
| R73 | 62.5 kΩ |
| R68 | 619 kΩ |
| R14, R32 | 100 kΩ |
| R29 | 200 kΩ |

Figure 7:
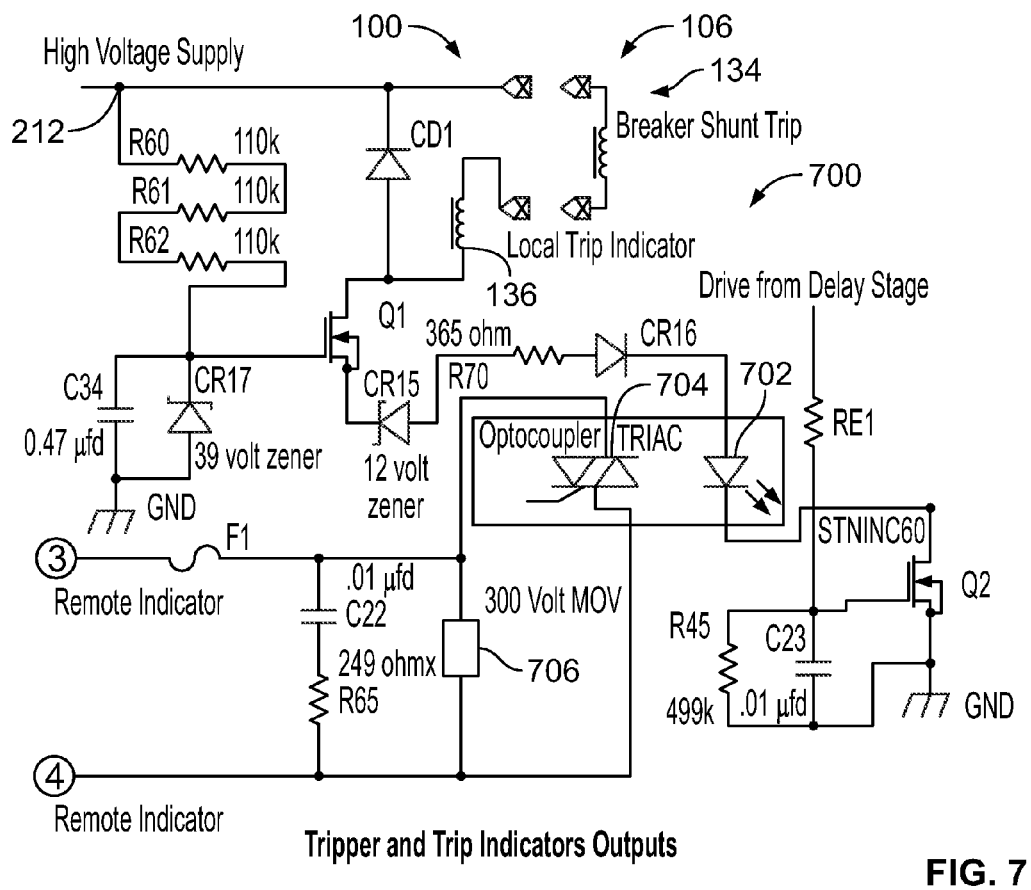
FIG. 7 illustrates a schematic representation of a shunt trip and trip indicator output circuit.

FIG. 7 illustrates a schematic representation of a shunt trip and trip indicator output circuit 700, which supplies a sufficient amount of current to energize the trip solenoid in the shunt trip module 134 and the local (to the module 100) and remote trip indicators 136, 138 and correspondingly the trip indicator 135. During normal operation of the circuit 700, i.e., when it is monitoring for ground fault leakage but not detecting any, the current drain through the pre-regulator transistor Q1 is about 1.2 mA. This current passes through both the shunt trip coil (e.g., of an electronic solenoid) in the shunt trip module 134 of the circuit breaker 106 and the solenoid coil of the local trip indicator 136. This level of 1.2 mA is well below the current required to energize these solenoids.

If a ground fault condition is detected by the detector 126, after the time delay has elapsed through the delay-time delay adjustment circuit 130, the output of the delay-time delay adjustment circuit 130 causes the transistor Q2 to turn on, drawing current through an LED 702 in an optocoupler 704, through the clamping diode CR15, and ultimately through the shunt trip coil of the shunt trip module 134 and the trip indicator coil of the local indicator 136. At this time, the transistor Q2 draws approximately 30-40 mA of current, acting as a current sink in the low voltage stage (regulated 12V) of the power supply 108. The additional current drawn by the transistor Q2 causes the current from the source terminal of the transistor Q1 to be increased from 1-2 mA (the quiescent value) to about 70-80 mA. This additional current drawn by the transistor Q1 is determined by the voltage on the cathode of the diode CR15 and the resistor R70. The increased current drawn by the transistor Q1 is sufficient to shunt trip the circuit breaker 106 and to energize the corresponding coils of the local trip indicator 136 and of the remote trip indicator 138. After the fault has been cleared, the companion circuit breaker 106 and the shunt trip 134 will need to be reset. The local indicator 136 on the module 100 can be reset by depressing the flag that was popped up by the solenoid of the local indicator 136 acting upon the pop-up flag following detection of a ground fault.

The optocoupler 704 provides galvanic isolation between the circuit monitoring for ground faults and the circuitry downstream of the remote indicator 138, and thus operates as an electronic switch 132 between the two circuits. The optocoupler 704 can operate in one of two modes, depending upon the type of supply connected to its output terminals: pulsed or continuous. When an AC source is connected to the output terminals of the optocoupler 704, it operates in pulsed mode, momentarily operating for about 20 ms and then disconnecting. No manual reset is needed in the pulsed mode. If a DC supply is connected to the output of the optocoupler 704, the output is continuous, meaning that the electronic switch 132 will remain closed or conducting and requires a manual reset, such as by momentarily removing power from the output terminals of the optocoupler 704.

An electrical fuse F1 provides protection should a short circuit develop on the circuit board 120, thus preventing damage to the wire connected to the terminals of the remote trip circuit 138 and overheating of the circuit board 120. Under normal operation, the integrity of the electrical fuse F1 will remain intact.

A metal oxide varistor (MOV) 706 connected across the output terminals 3, 4 of the remote indicator circuit 138 provides protection for the optocoupler 704 against high voltage impulses. The capacitor C22 and the resistor R65 provide protection against a high rate of rise across the output of the optocoupler 704 and thereby prevent a rate of rise nuisance turn-on of the output device connected to the optocoupler 704.

Exemplary values or ratings of the components shown in FIG. 7 are set forth in the following table:

| Component | Exemplary Value or rating |
|---|---|
| R65 | 249 Ω |
| C22, C23 | 0.01 μF |
| R45 | 499 kΩ |
| R70 | 365 Ω |
| C34 | 0.47 μF |

Figure 8:
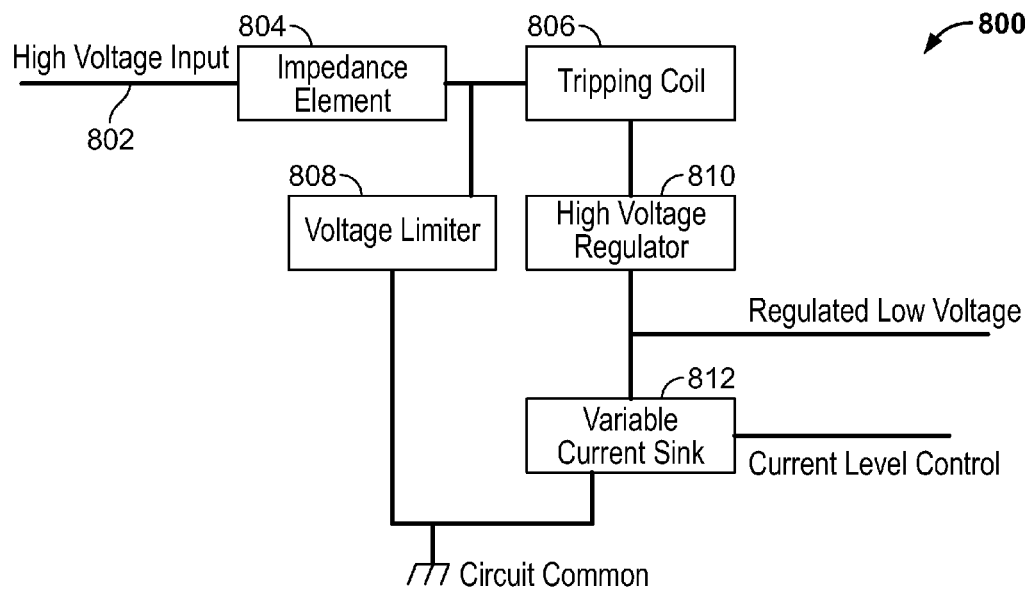
FIG. 8 is a functional block diagram of a circuit for controlling a trip solenoid powered by a power supply voltage without using high voltage components to energize the solenoid.

FIG. 8 is a functional block diagram of a circuit 800 for controlling a trip solenoid powered by a line-powered power supply without using high voltage components to energize the solenoid. A voltage input 802, which can correspond to, for example, the line conductors 104a-c, is received by an impedance element 804, such as the inductors L1-L3 shown in FIG. 2. The voltage input 802 can accept a range of low voltages from low to high, such as between 120-600V. A voltage limiter 808 is connected to the voltage input 802 and to ground. Together, the impedance element 804 and the voltage limiter 808 protects against transient voltages. A tripping coil 806 in the circuit breaker, such as in the shunt trip module 134 of the circuit breaker 106 shown in FIG. 1, is powered by the voltage input 802, and this configuration further enhances protection against transient voltages by working in concert with a high voltage regulator 810, such as the pre-regulator circuit 210 in conjunction with the 12V regulator 110 shown in FIG. 2. The high voltage regulator 810 produces at its output a regulated low voltage, such as 12V produced by the 12V regulator 110 shown in FIGS. 1 and 2.

As stated above, in normal monitoring mode of operation when no ground fault is detected, only a few milliamps of current passes through the tripping coil 806, not enough to energize it and cause it to trip the circuit breaker 106. To trip the circuit breaker, a much high level of current, over an order of magnitude increase over the quiescent current, must be passed through the tripping coil 806 to cause a trip. This can be done by providing a path to ground directly from the trip coil. However, in the implementation shown in FIG. 8, a variable current sink 812, which is controlled by the low voltage section of the circuit 800, is directed to increase the amount of current causing more current to pass through the tripping coil 806 in the high voltage section of the circuit 800. The variable current sink 812 can include, for example, the transistor Q2, the resistor R45, and the capacitor C23 shown in FIG. 7.

Advantages of the arrangement shown in FIG. 8 include no additional high voltage components are required to energize the tripping coil 806. Because the power supply must operate over a wide range of voltage inputs (e.g., as high as 8:1 and typically 5:1), the tripping coil 806 will have nearly the same level of current when energized, regardless of the line voltage input to the power supply. This level of current required for tripping (e.g., about 75 mA) can be optimized to provide adequate current at the low voltage end of the applied voltage without having excessive current at the high end of the operating voltage range. The variable current sink 812 allows the same amount of current to pass through the tripping coil 806 by adjusting the level of current sink as a function of the high input voltage 802.

Figure 9:
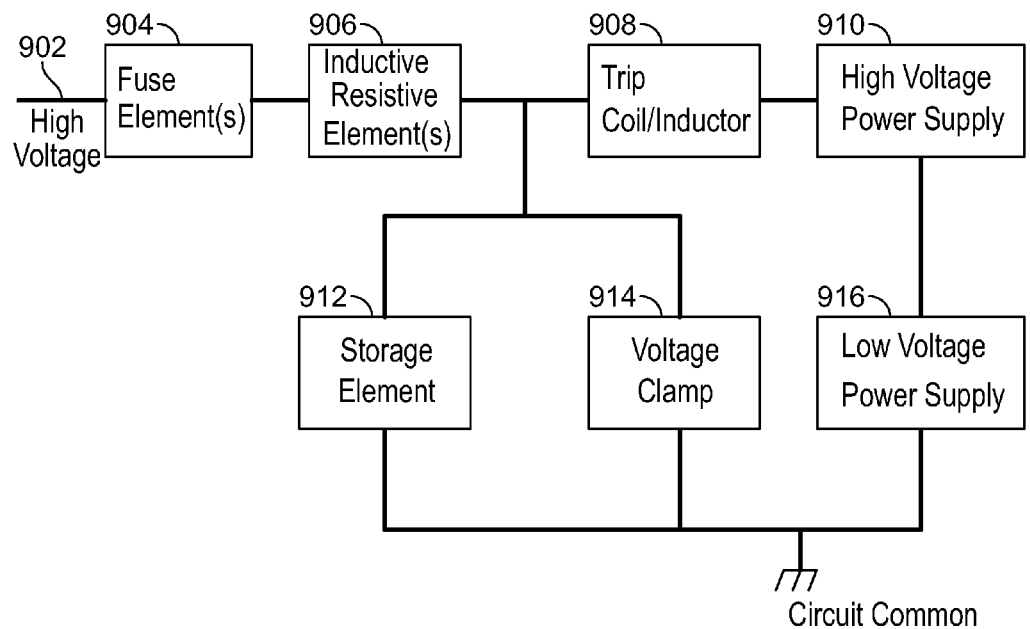
FIG. 9 is a functional block diagram of a circuit for suppressing transients and for protecting against short circuits for use in a companion module to a circuit breaker.

FIG. 9 is a functional block diagram of a circuit 900 for suppressing transients and for protecting against short circuits for use in a companion module to a circuit breaker, such as the module 100. A voltage input 902, which can correspond to, for example, the line conductors 104a-c, is received by one or more impedance elements 906, such as the inductors L1-L3 shown in FIG. 2. One or more fuse elements 904, which can correspond to a fuse device, are interposed in series between the voltage input 902 and the impedance element(s) 906. The voltage input 902 can accept a wide range of input voltages in the low voltage range, such as up to 600V. As a result, the electronic components of the module 100 are exposed to higher energy at these relatively higher voltages. A trip coil or inductor 908 is powered directly from the line voltage without any intervening transformer to provide galvanic protection. Thus, a protection circuit for limiting damage to the sensitive electronics of the circuit 900 and to provide safe operation of the fault-sensing electronics are needed. The circuit 900 includes two such protection schemes. First, protection against short circuits in the circuit 900 is provided by the fuse element(s) 904, positioned in series directly to the voltage input 902. If excessive current is drawn due to a shorted component in the circuit 900, the fuse element 904 will open quickly, preventing damage caused by a fire or expulsion of debris or pieces of components during the short circuit.

The second type of protection provided by the circuit 900 is protection against a high transient voltage appearing on the voltage input 902. As discussed above, transient voltage protection can be provided by the inductive element 906, which provides both resistance and inductance to the transient, and a storage element 912, such as the capacitor C19 shown in FIG. 2, connected in parallel with a voltage clamp 914, such as the TVS2 and TVS3 devices shown in FIG. 2. The storage element 912 does not dissipate power while the voltage clamp 914 does dissipate energy of the transient. These components working in concert provide a voltage clamping function while dissipating a minimum of energy. Most if not all of the energy of the transient will be absorbed by the storage element 912 and the voltage clamp 914. A second line of defense against a high voltage transient is provided by a combination of the trip coil 908, which also provides a resistance and inductance to the transient, working with a high voltage power supply 910 (operating at the higher end of the low voltage range on the line conductors 104a-c), such as the high voltage pre-regulator circuit 210 shown in FIG. 2, to further reduce the peak current that the storage element 912 and the voltage clamp 914 need to absorb. The trip coil 908 serves two purposes— assist in transient suppression and provide an electromechanical tripping function. Likewise, the pre-regulator circuit 210 also provides voltage regulation in addition to transient suppression. The low voltage power supply 916 shown in FIG. 9 provides a voltage supply for the low voltage electronics of the circuit 900. The low voltage power supply 916 can correspond to the low voltage regulator circuit 110 shown in FIG. 2, for example.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A module connectable to a circuit breaker having a movable contact for making or breaking electrical connections with a circuit protected by the circuit breaker, comprising:
   an enclosure configured to be connected to the circuit breaker;
   a power supply within the enclosure, the power supply including:
      a voltage input configured to receive an operating range of nominal operating voltages from one or more conductors carrying one or more phases of electrical current through the circuit breaker and to provide a constant direct current voltage output across the operating range of nominal voltages inputted into the power supply, a ratio of a maximum nominal operating voltage to a minimum nominal operating voltage in the operating range exceeding 4:1,
      a inductive element connected between the voltage input and a tripping coil of the circuit breaker,
      a voltage clamp,
      a storage element in parallel with the voltage clamp, each connected between the inductive element and the trip coil, for suppressing a transient voltage presented at the voltage input, wherein the inductive element reduces a peak current absorbed by the storage element and by the voltage clamp, and
      a rectifier circuit connected between the inductive element and the storage element without any transformers along a conduction path from the voltage input to the storage element, wherein the voltage clamp and the storage element are connected to an output of the rectifier circuit; and
   a current sensor surrounding the one or more conductors and producing a signal indicative of the current flowing through the one or more conductors for causing the circuit breaker to trip in response to detecting an electrical fault, wherein the storage element is a capacitor having a rating above the maximum nominal voltage of the operating range, and wherein the voltage clamp includes a transient voltage suppression (TVS) diode for absorbing transient voltages above a clamping voltage of the voltage clamp.

2. The module of claim 1, wherein the capacitor has a value of at least one microfarad.

3. The module of claim 1, wherein a capacitance value of the capacitor is a function of any one or more of a wave shape of the transient voltage, a peak voltage of the transient voltage, a duration of the transient voltage at a predetermined voltage, and a series impedance of an electrical conductor from a source of the transient voltage to the module.

4. The module of claim 1, wherein the capacitor has a value sufficient to absorb the energy of a transient voltage as defined in Underwriters Laboratory (UL) 943.

5. The module of claim 1, wherein the minimum nominal operating voltage is 120V and the maximum nominal operating voltage is 600V.

6. The module of claim 1, wherein the power supply is a linear power supply, and wherein the ratio is at least 5:1.

7. The module of claim 1, further comprising a local indicator coil for indicating that a trip occurred, the local indicator coil, the tripping coil, and the inductive element reducing the peak current absorbed by at least the storage element.

8. The module of claim 1, further comprising a sensing and delay circuit connected to the current sensor, the sensing and delay circuit producing an output responsive to detecting a ground fault relative to the one or more conductors, the ground fault including a low-level ground fault in the range of milliamps.

9. The module of claim 1, the power supply further including a fuse between the voltage input and the resistive element and configured to open responsive to a short circuit in the module.

10. An assembly for a circuit breaker having a movable contact for making or breaking electrical connections with a circuit protected by the circuit breaker, comprising:
   a companion module having a housing and being connected to the circuit breaker;
   a power supply within the module, the power supply including:
      a voltage input configured to receive a high voltage within an operating range of nominal operating voltages from one or more conductors carrying a corresponding one or more phases of electrical current through the circuit breaker and to provide a direct current voltage output across the operating range of nominal voltages received at the power supply, a ratio of a maximum nominal operating voltage to a minimum nominal operating voltage in the operating range exceeding 5:1,
      an inductor connected between the voltage input and a tripping coil of the circuit breaker,
      a voltage clamp having a clamping voltage, the voltage clamp conducting electrical current responsive to the clamping voltage being exceeded,
      a large capacitor in parallel with the voltage clamp, each connected between the voltage input and the trip coil and to circuit ground, for suppressing a transient voltage presented at the voltage input, the inductor reducing a peak current absorbed by at least the large capacitor, and
      a rectifier circuit connected between the inductor and directly to the large capacitor without any transformers along a conducting path from the voltage input to the large capacitor, wherein the voltage clamp and the large capacitor are connected to an output of the rectifier circuit; and
   a current sensor surrounding the one or more conductors and producing a signal indicative of the current flowing through the one or more conductors for causing the circuit breaker to trip in response to detecting an electrical fault, wherein the large capacitor has a rating above the maximum nominal voltage of the operating range, and wherein the voltage clamp includes a transient voltage suppression (TVS) diode for absorbing transient voltages above a clamping voltage of the voltage clamp.

11. The assembly of claim 10, wherein the large capacitor has a capacitance value of at least one microfarad.

12. The assembly of claim 11, wherein the large capacitor has a voltage rating of 1100V.

13. The assembly of claim 10, wherein a capacitance value of the capacitor is a function of at least a peak voltage of the transient voltage and a series impedance of an electrical conductor from a source of the transient voltage to the module.

14. The assembly of claim 10, wherein the capacitor has a capacitance sufficient to absorb, together with the voltage clamp, all or substantially all of the energy of a transient voltage as defined in Underwriters Laboratory (UL) 943.

15. The assembly of claim 10, wherein the minimum nominal operating voltage is 120V and the maximum nominal operating voltage is 600V.

16. The assembly of claim 10, wherein the voltage clamp includes a high voltage clamping diode connected in series with the TVS diode.

17. The assembly of claim 16, wherein the clamping voltage of each of the high voltage clamping and TVS diodes is 440V.

18. The assembly of claim 10, further comprising a local indicator coil for indicating whether the circuit breaker has been tripped, the local indicator coil, the tripping coil, and the inductor reducing the peak current absorbed by at least the storage element responsive to the presence of the transient voltage.

* * * * *